US012750645B2

(12) United States Patent
Lee et al.

(10) Patent No.: US 12,750,645 B2
(45) Date of Patent: Sep. 29, 2026

(54) TRANSFERRING BULK DATA BETWEEN VEHICLES OF A MICRO CLOUD

(71) Applicant: Toyota Motor Engineering & Manufacturing North America, Inc., Plano, TX (US)

(72) Inventors: Chunghan Lee, Mountain View, CA (US); Seyhan Ucar, Mountain View, CA (US); Onur Altintas, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 18/432,168

(22) Filed: Feb. 5, 2024

(65) Prior Publication Data

US 2025/0254503 A1 Aug. 7, 2025

(51) Int. Cl.
*H04W 4/46* (2018.01)
*H04L 43/0882* (2022.01)
(Continued)

(52) U.S. Cl.
CPC ........... *H04W 4/46* (2018.02); *H04L 43/0882* (2013.01); *H04W 24/08* (2013.01); *H04W 24/10* (2013.01);
(Continued)

(58) Field of Classification Search
CPC ........... H04W 4/46; H04W 4/48; H04W 4/70; H04W 72/40
See application file for complete search history.

(56) References Cited

U.S. PATENT DOCUMENTS

2014/0321380 A1 10/2014 Zhang et al.
2024/0004715 A1* 1/2024 Bai ....................... G06F 9/5072

FOREIGN PATENT DOCUMENTS

WO 2022035559 A1 2/2022

OTHER PUBLICATIONS

Hu et al., "Evaluation and Characterization of Available Bandwidth Probing Techniques," IEEE Journal on Selected Areas in Communications, vol. 21, No. 6, pp. 879-894.

(Continued)

*Primary Examiner* — Tu X Nguyen
(74) *Attorney, Agent, or Firm* — Christopher G. Darrow; Darrow Mustafa PC

(57) ABSTRACT

A system for transferring bulk data between vehicles of a micro cloud can include a processor and a memory. The memory can store an available bandwidth estimation module and a bulk data transfer module. The available bandwidth estimation module can include instructions that cause the processor to produce, using an available bandwidth estimation model, a current network metric, and current vehicle trajectory information, an estimate of an available bandwidth for a transfer of bulk data. The bulk data transfer module can include instructions that cause the processor to: (1) determine, based on the estimate and a size of the bulk data, a number of connections, within a wireless channel of a micro cloud, needed to transfer the bulk data within a specific time duration and (2) cause the transfer of the bulk data from a transmitting vehicle, of the micro cloud, to a receiving vehicle of the micro cloud.

20 Claims, 6 Drawing Sheets

(51) Int. Cl.
*H04W 24/08* (2009.01)
*H04W 24/10* (2009.01)
*H04W 28/02* (2009.01)
*H04W 28/08* (2023.01)
*H04W 84/18* (2009.01)

(52) U.S. Cl.
CPC ... *H04W 28/0284* (2013.01); *H04W 28/0967* (2020.05); *H04W 84/18* (2013.01)

(56) References Cited

OTHER PUBLICATIONS

Bokani et al., "Comprehensive Mobile Bandwidth Traces from Vehicular Networks," Proceedings of the 7th International Conference on Multimedia Systems, pp. 1-6, May 10, 2016.
Sim et al., "Adaptive Transfer Adjustment in Efficient Bulk Data Transfer Management for Climate Dataset," Parallel and Distributed Computing and Systems, Nov. 2010.
Bychkovsky et al., "A Measurement Study of Vehicular Internet Access Using In Situ Wi-Fi Networks," ACM/IEEE International Conference on Mobile Computing and Networking, 2006.
Schumacher et al., "Vehicle-to-Vehicle IEEE 802.11p Performance Measurements at Urban Intersections," 2012 IEEE International Conference on Communications (ICC), pp. 7131-7135, 2012.
Jerbi et al., "Experimental Assessment of V2V and 12V Communications," 2007 IEEE International Conference on Mobile Adhoc and Sensor Systems, pp. 1-6, 2007.
Koti et al., "Multi Agent Assisted Safety Information Dissemination Scheme for V2V Communication in VANETs: Intelligent Agent Approach," 2019 IEEE International Conference on System, Computation, Automation and Networking (ICSCAN), pp. 1-6, 2019.
Tyagi et al., "Security, Privacy Research Issue in Various Computing Platforms: A Survey and the Road Ahead," Journal of Information Assurance and Security, vol. 15, pp. 1-16, 2020.
Chen et al., "A Measurement-based Study of MultiPath TCP Performance over Wireless Networks," Proceedings of the 2013 Conference on Internet Measurement Conference, pp. 455-468, Oct. 23, 2013.
Lee et al., "DEFT: Multipath TCP for High Speed Low Latency Communications in 5G Networks," IEEE Transactions on Mobile Computing, vol. 20, No. 12, pp. 3311-3323, Dec. 1, 2021.
Bai et al., "RNN-based Approach to TCP Throughput Prediction," 2020 Eighth International Symposium on Computing and Networking Workshops (CANDARW), pp. 391-395, 2020.
Hacker et al., "The End-to-End Performance Effects of Parallel TCP Sockets on a Lossy Wide-Area Network," Proceedings 16th International Parallel and Distributed Processing Symposium, pp. 1-10, 2002.
Unknown, "Connected car," last accessed on Nov. 25, 2023, 14 pages, https://en.wikipedia.org/wiki/Connected_car.
Unknown, "Network congestion," last accessed on Mar. 15, 2023, 8 pages, https://en.wikipedia.org/wiki/Network_congestion.
Unknown, "Transmission control protocol," last accessed on Dec. 2, 2023, 22 pages, https://en.wikipedia.org/wiki/Transmission_Control_Protocol.
Ucar et al., "Chain of Interdependent Vehicular Micro Clouds," 2021 IEEE 93rd Vehicular Technology Conference (VTC2021-Spring), pp. 1-5.
Higuchi et al., "How to Keep a Vehicular Micro Cloud Intact," 2018 IEEE 87th Vehicular Technology Conference (VTC Spring), pp. 1-5.
Jesse Rink et al., "802.11ac wireless: Channel Bonding, MIMO, Spatial Streams, and Beamforming," Aug. 26, 2016, 11 pages, found at https://www.sourceonetechnology.com/802-11ac-wireless-channel-bonding-mimo-spatial-streams-and-beamforming/.

* cited by examiner

TRANSFERRING BULK DATA BETWEEN VEHICLES OF A MICRO CLOUD

TECHNICAL FIELD

The disclosed technologies are directed to transferring bulk data between vehicles of a micro cloud.

BACKGROUND

A vehicle that includes, for example, a communications device configured to exchange communications between the vehicle and other devices in a packet-switched network can be referred to as a "connected car." For example, such other devices can include another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. For example, "Vehicle to Everything" (V2X) technology can integrate aspects of these individual communications technologies.

Originally developed to support applications related, for example, to vehicle safety, vehicle operations management, and vehicle breakdown management, technologies for connected cars can now also support applications related, for example, to navigation (e.g., turn-by-turn navigation), driver assistance, and other technologies related to vehicle automation. More recently, technologies for connected cars can be used for applications related, for example, to a comfort of occupants of a vehicle, an assessment of a fitness of an operator of the vehicle, abilities to conduct commerce from the vehicle (e.g., e-commerce), control of Internet-of-things devices, and provision of entertainment to the occupants of the vehicle. For example, entertainment applications supported by technologies for connected cars can include an in-car entertainment system, a satellite radio, an Internet radio, a media streaming receiver, or the like.

Vehicles that include, for example, technologies for connected cars and one or more of computing resources or data storage resources can be configured to form a "micro cloud." For example, such vehicles, having formed a micro cloud, can be considered to be members of the micro cloud. For example, the micro cloud can be characterized by a distribution, among the members of the micro cloud, of the computing resources, the data storage resources, or both in order to collaborate to execute operations for a specific purpose.

For example, the micro cloud can be a mobile micro cloud. For example, the mobile micro cloud can be characterized by a zone centered on a leader of the mobile micro cloud. For example, the leader can determine, for example, among one or more other connected cars in the zone, one or more candidates to become one or more other members of the mobile micro cloud. For example, the leader can distribute, to one or more of the one or more other members, a task associated with the operations for the specific purpose.

For example, the micro cloud can be a stationary micro cloud. For example, the stationary micro cloud can be characterized, for example, by an area at a specific geographical location. For example, one or more connected cars: (1) can become, upon entering the area, members of the stationary micro cloud and (2) can cease to be, upon leaving the area, members of the stationary micro cloud. For example, a server associated with the stationary micro cloud can be used to assist with management of the operations executed by the members of the stationary micro cloud.

SUMMARY

In an embodiment, a system for transferring bulk data between vehicles of a micro cloud can include a processor and a memory. The memory can store an available bandwidth estimation module and a bulk data transfer module. The available bandwidth estimation module can include instructions that, when executed by the processor, cause the processor to produce, using an available bandwidth estimation model, a current network metric, and current vehicle trajectory information, an estimate of an available bandwidth for a transfer of bulk data. The bulk data transfer module can include instructions that, when executed by the processor, cause the processor to: (1) determine, based on the estimate and a size of the bulk data, a number of connections, within a wireless channel of a micro cloud, needed to transfer the bulk data within a specific time duration and (2) cause the transfer of the bulk data from a transmitting vehicle, of the micro cloud, to a receiving vehicle of the micro cloud.

In another embodiment, a method for transferring bulk data between vehicles of a micro cloud can include producing, by a processor using an available bandwidth estimation model, a current network metric, and current vehicle trajectory information, an estimate of an available bandwidth for a transfer of bulk data. The method can include determining, by the processor and based on the estimate and a size of the bulk data, a number of connections, within a wireless channel of a micro cloud, needed to transfer the bulk data within a specific time duration. The method can include causing, by the processor, the transfer of the bulk data from a transmitting vehicle, of the micro cloud, to a receiving vehicle of the micro cloud.

In another embodiment, a non-transitory computer-readable medium for transferring bulk data between vehicles of a micro cloud can include instructions that, when executed by one or more processors, cause the one or more processors to produce, using an available bandwidth estimation model, a current network metric, and current vehicle trajectory information, an estimate of an available bandwidth for a transfer of bulk data. The non-transitory computer-readable medium can include instructions that, when executed by the one or more processors, cause the one or more processors to determine, based on the estimate and a size of the bulk data, a number of connections, within a wireless channel of a micro cloud, needed to transfer the bulk data within a specific time duration. The non-transitory computer-readable medium can include instructions that, when executed by the one or more processors, cause the one or more processors to cause the transfer of the bulk data from a transmitting vehicle, of the micro cloud, to a receiving vehicle of the micro cloud.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies can cause a transfer of bulk data between vehicles of a micro cloud. For example: (1) a chunk of data can be transmitted, as a probing transmission, from a transmitting vehicle, of the micro cloud, to receiving vehicle of the micro cloud and (2) a result of the probing transmission can be received, from the receiving vehicle, by the transmitting vehicle. For example, the chunk of data can be a portion of the bulk data. An estimate of an available bandwidth for the transfer of the bulk data can be produced using an available bandwidth estimation model, a current network metric, and current vehicle trajectory information. Additionally, for example, a production of the estimate of the available bandwidth can use the result of the probing transmission. For example, the available bandwidth estimation model can be received from an available bandwidth estimation model production system. For example, the current network metric can include one or more of a received signal strength, a signal-to-noise ratio, a measurement of available bandwidth, a measurement of network congestion, a measurement of packet loss and retransmission, a measurement of round-trip time, a measurement of throughput, or the like. For example, the current vehicle trajectory information can include one or more of: (1) an intended path of travel of one or more of the transmitting vehicle, the receiving vehicle, or another vehicle of the micro cloud or (2) a speed of the transmitting vehicle, the receiving vehicle, the other vehicle, or any combination of these vehicles. A number of connections, within a wireless channel of the micro cloud, needed to transfer the bulk data within a specific time duration can be determined based on the estimate of the available bandwidth and a size of the bulk data. For example, the number of the connections needed to transfer the bulk data within the specific time duration can be determined by dividing the size of the bulk data by the estimate of the available bandwidth. The bulk data can be transferred from the transmitting vehicle to the receiving vehicle. For example: (1) the bulk data can be divided into one or more chunks such that a number of the one or more chunks is equal to the number of the connections needed to transfer the bulk data within the specific time duration, (2) for each of the connections needed to transfer the bulk data within the specific time duration, a connection can be established between the transmitting vehicle and the receiving vehicle, and (3) for the each of the connections needed to transfer the bulk data within the specific time duration, a corresponding chunk, of the chunks, can be transferred from the transmitting vehicle to the receiving vehicle. For example, the chunks can be transferred concurrently.

Figure 1:
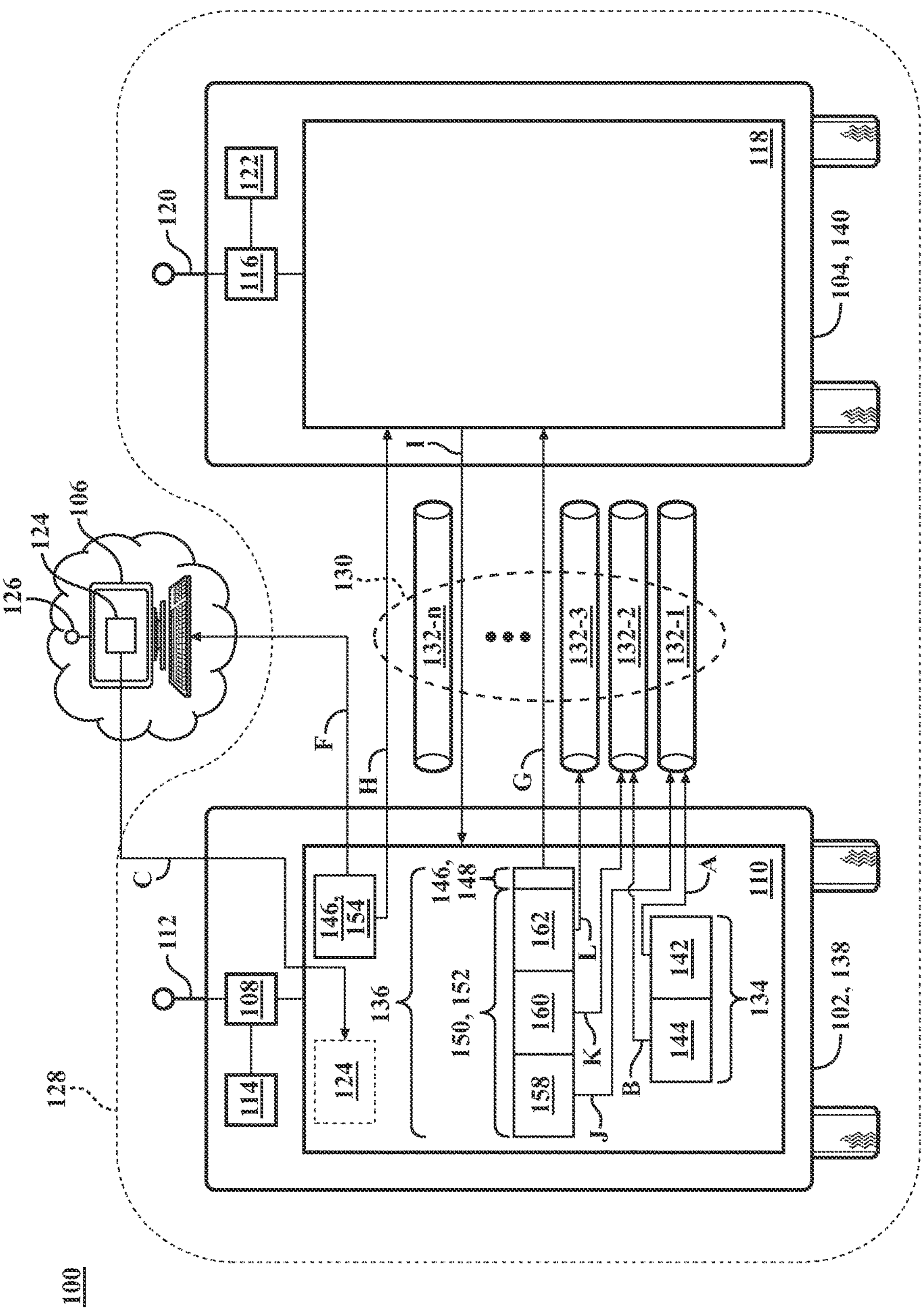
FIG. 1 includes a diagram that illustrates an example of a specific environment for transferring bulk data between vehicles of a micro cloud, according to the disclosed technologies.

FIG. 1 includes a diagram that illustrates an example of a specific environment 100 for transferring bulk data between vehicles of a micro cloud, according to the disclosed technologies. For example, the environment 100 can include a first vehicle 102, a second vehicle 104, and an available bandwidth estimation model production system 106. For example, the first vehicle 102 can include a processor 108, a memory 110, a communications device 112, and an in-car entertainment system 114. The memory 110 can be communicably coupled to the processor 108. The communications device 112 can be communicably coupled to the processor 108. The in-car entertainment system 114 can be communicably coupled to the processor 108. For example, the second vehicle 104 can include a processor 116, a memory 118, a communications device 120, and an in-car entertainment system 122. The memory 118 can be communicably coupled to the processor 116. The communications device 120 can be communicably coupled to the processor 116. The in-car entertainment system 120 can be communicably coupled to the processor 116. For example, the available bandwidth estimation model production system 106 can be configured to produce an available bandwidth estimation model 124. For example, the available bandwidth estimation model production system 106 can include a communications device 126. For example, the first vehicle 102 and the second vehicle 104 can be members of a micro cloud 128. For example, the micro cloud 128 can use a wireless channel 130. For example, the wireless channel 130 can include connections 132-1, 132-2, 132-3, . . . , **132-*n*. For example, a first file 134 for a first vehicle camera video can be stored in a video file format in the memory 110 of the first vehicle 102. For example, the first file 134 can consume four gigabytes of the memory 110. For example, a second file 136 for a second vehicle camera video can be stored in the video file format in the memory 110 of the first vehicle 102. For example, the second file 136 can consume five gigabytes of the memory 110. For example, the first vehicle 102 and the second vehicle 104 can collaborate, as members of the micro cloud 128, to transfer the first file 134 from the first vehicle 102 to the second vehicle 104. For example, the first vehicle 102 and the second vehicle 104 can collaborate, as members of the micro cloud 128, to transfer the second file 136 from the first vehicle 102 to the second vehicle 104. For example: (1) the first vehicle 102 can be a transmitting vehicle 138 of the micro cloud 128 and (2) the second vehicle 104 can be a receiving vehicle 140 of the micro cloud 128**.

Figure 2:
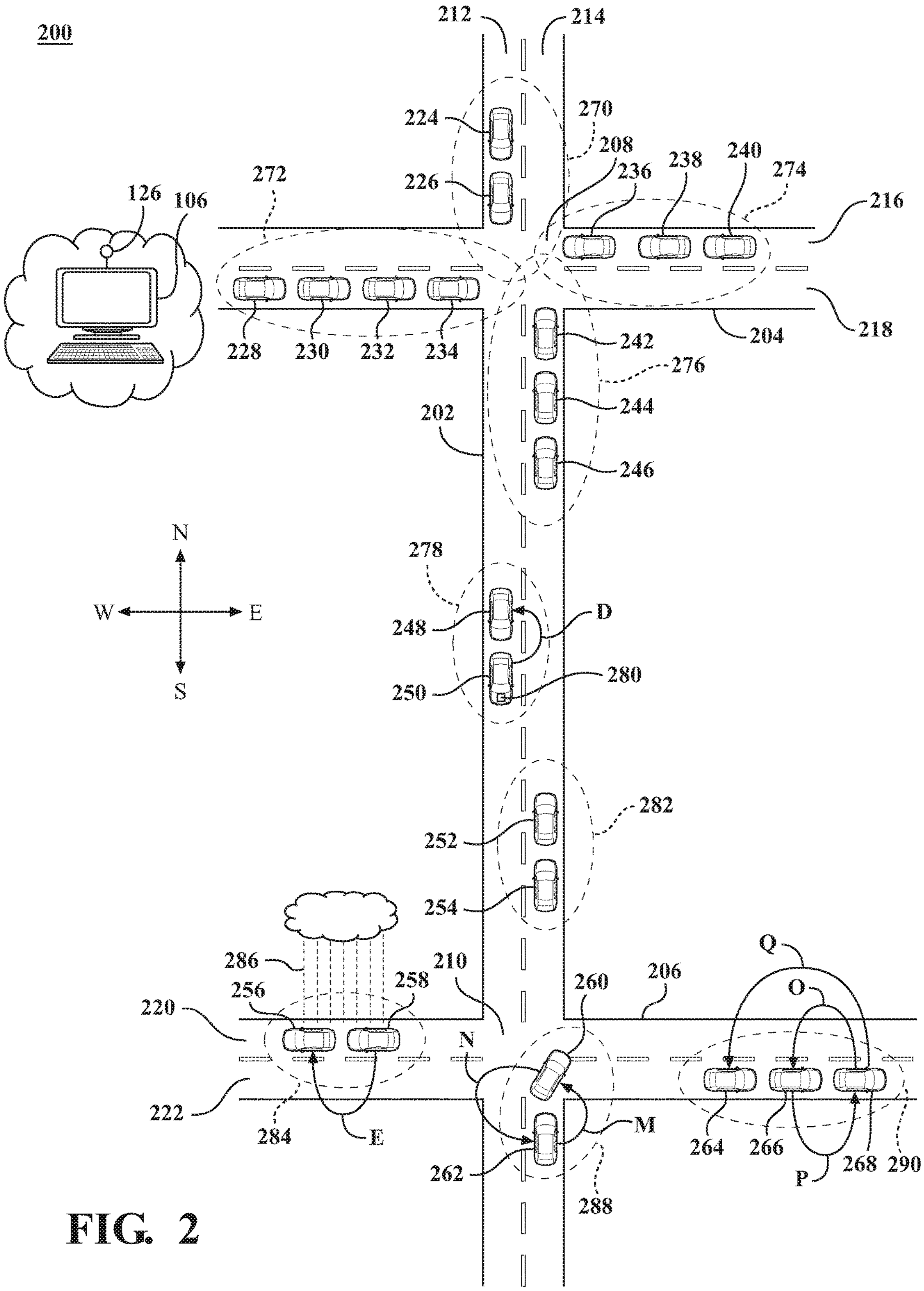
FIG. 2 includes a diagram that illustrates an example of a more general environment for transferring bulk data between vehicles of a micro cloud, according to the disclosed technologies.

FIG. 2 includes a diagram that illustrates an example of a more general environment 200 for transferring bulk data between vehicles of a micro cloud, according to the disclosed technologies. For example, the environment 200 can include a first road 202 (disposed along a line of longitude), a second road 204 (disposed along a line of latitude), and a third road 206 (disposed along a line of latitude, south of the second road 204). For example, a first intersection 208 can be formed by the first road 202 and the second road 204. For example, a second intersection 210 can be formed by the first road 202 and the third road 206. For example, the first road 202 can have a lane 212 for southbound traffic and a lane 214 for northbound traffic. For example, the second road 204 can have a lane 216 for westbound traffic and a lane 218 for eastbound traffic. For example, the third road 206 can have a lane 220 for westbound traffic and a lane 222 for eastbound traffic.

For example, the environment 200 can include a first vehicle 224, a second vehicle 226, a third vehicle 228, a fourth vehicle 230, a fifth vehicle 232, a sixth vehicle 234, a seventh vehicle 236, an eighth vehicle 238, a ninth vehicle 240, a tenth vehicle 242, an eleventh vehicle 244, a twelfth vehicle 246, a thirteenth vehicle 248, a fourteenth vehicle 250, a fifteenth vehicle 252, a sixteenth vehicle 254, a seventeenth vehicle 256, an eighteenth vehicle 258, a nineteenth vehicle 260, a twentieth vehicle 262, a twenty-first vehicle 264, a twenty-second vehicle 266, and a twenty-third vehicle 268.

For example, the first vehicle 224 and the second vehicle 226 can be located in the lane 212 north of the first intersection 208 and can be members of a first micro cloud 270. For example, the third vehicle 228, the fourth vehicle 230, the fifth vehicle 232, and the sixth vehicle 234 can be located in the lane 218 west of the first intersection 208 and can be members of a second micro cloud 272. For example, the seventh vehicle 236, the eighth vehicle 238, and the ninth vehicle 240 can be located in the lane 216 east of the first intersection 208 and can be members of a third micro cloud 274. For example, the tenth vehicle 242, the eleventh vehicle 244, and the twelfth vehicle 246 can be located in the lane 214 south of the first intersection 208 and can be members of a fourth micro cloud 276. For example, each of the first micro cloud 270, the second micro cloud 272, the third micro cloud 274, and the fourth micro cloud 276 can overlap each other of the first micro cloud 270, the second micro cloud 272, the third micro cloud 274, and the fourth micro cloud 276.

For example, the thirteenth vehicle 248 and the fourteenth vehicle 250 can be located in the lane 212 between the first intersection 208 and the second intersection 210 and can be members of a fifth micro cloud 278. For example, the fourteenth vehicle 250 can include a sensor 280. For example, the sensor 280 can include one or more of an imaging sensor or a ranging sensor. For example, the fifteenth vehicle 252 and the sixteenth vehicle 254 can be located in the lane 214 between the first intersection 208 and the second intersection 210 and can be members of a sixth micro cloud 282.

For example, the seventeenth vehicle 256 and the eighteenth vehicle 258 can be located in the lane 220 west of the second intersection 210 and can be members of a seventh micro cloud 284. For example, the seventeenth vehicle 256 and the eighteenth vehicle 258 can be located within an area of rainfall with precipitation 286 falling onto the seventeenth vehicle 256 and the eighteenth vehicle 258.

For example, the nineteenth vehicle 260 can be located in the second intersection 210 and can be in a process of making a turn from the lane 214 to the lane 222. For example, the twentieth vehicle 262 can be located in the lane 214 south of the second intersection 210. For example, the nineteenth vehicle 260 and the twentieth vehicle 262 can be members of an eighth micro cloud 288.

For example, the twenty-first vehicle 264, the twenty-second vehicle 266, and the twenty-third vehicle 268 can be located in the lane 222 east of the second intersection 210 and can be members of a ninth micro cloud 290.

For example, the environment 200 can include the available bandwidth estimation model production system 106, which can include the communications device 126.

Figure 3:
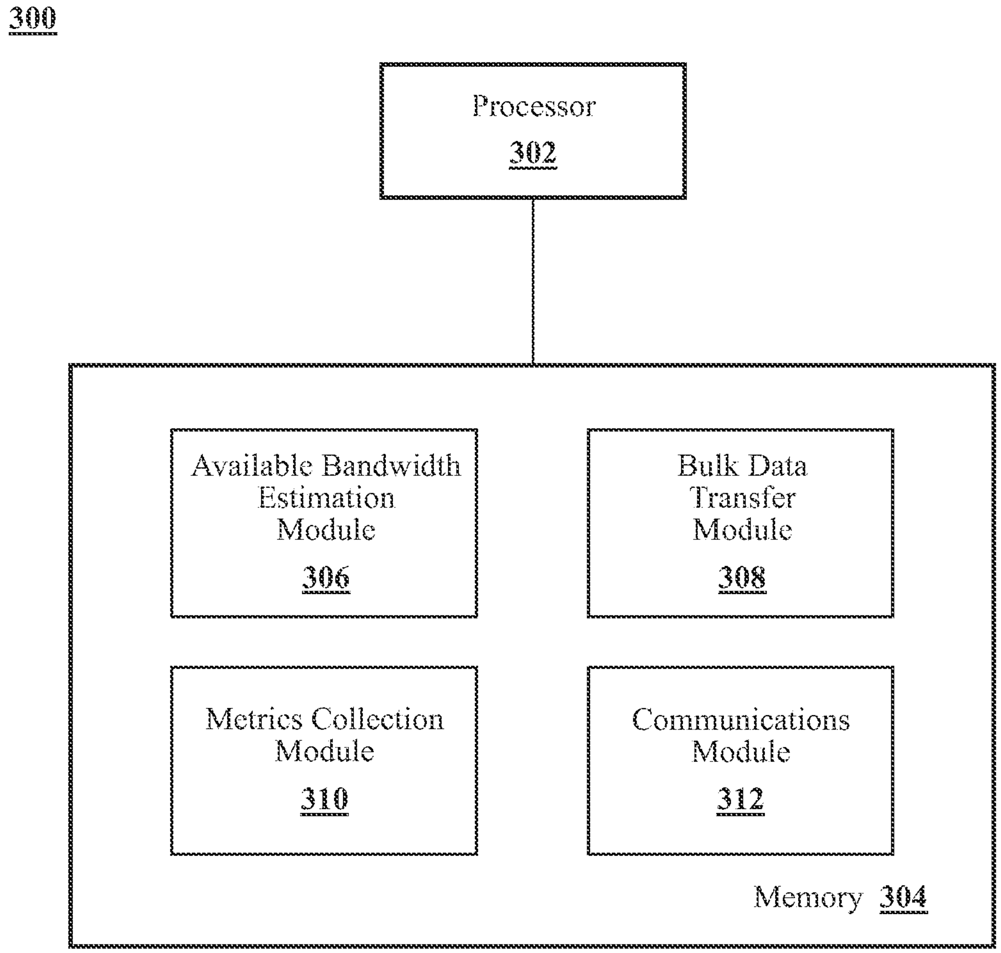
FIG. 3 is a block diagram that illustrates an example of a system for transferring bulk data between vehicles of a micro cloud, according to the disclosed technologies.

FIG. 3 is a block diagram that illustrates an example of a system 300 for transferring bulk data between vehicles of a micro cloud, according to the disclosed technologies. The system 300 can include, for example, a processor 302 and a memory 304. The memory 304 can be communicably coupled to the processor 302. For example, the memory 304 can store an available bandwidth estimation module 306 and a bulk data transfer module 308.

For example, the available bandwidth estimation module 306 can include instructions that function to control the processor 302 to produce, using an available bandwidth estimation model, a current network metric, and current vehicle trajectory information, an estimate of an available bandwidth for a transfer of the bulk data. For example, the current network metric can include one or more of a received signal strength, a signal-to-noise ratio, a measurement of available bandwidth, a measurement of network congestion, a measurement of packet loss and retransmission, a measurement of round-trip time, a measurement of throughput, or the like. For example, the current vehicle trajectory information can include one or more of: (1) an intended path of travel of the transmitting vehicle, the receiving vehicle, another vehicle of the micro cloud, or any combination of these vehicles or (2) a speed of the transmitting vehicle, the receiving vehicle, the other vehicle, or any combination of these vehicles.

For example, the bulk data transfer module 308 can include instructions that function to control the processor 302 to determine, based on the estimate of the available bandwidth and a size of the bulk data, a number of connections, within a wireless channel of a micro cloud, needed to transfer the bulk data within a specific time duration. For example, the instructions to determine the number of the connections needed to transfer the bulk data within the specific time duration can include instructions to divide the size of the bulk data by the estimate of the available bandwidth.

For example, the bulk data transfer module 308 can include instructions that function to control the processor 302 to cause the transfer of the bulk data from a transmitting vehicle, of the micro cloud, to a receiving vehicle of the micro cloud. For example, the instructions to cause the transfer of the bulk data can include instructions to: (1) divide the bulk data into one or more chunks, (2) establish, for each of the connections needed to transfer the bulk data within the specific time duration, a connection between the transmitting vehicle and the receiving vehicle, and (3) cause, for the each of the connections needed to transfer the bulk data within the specific time duration, a transfer of a corresponding chunk, of the chunks, from the transmitting vehicle to the receiving vehicle. For example, a number of the one or more chunks can be equal to the number of the connections needed to transfer the bulk data within the specific time duration.

With reference to FIGS. 1 and 3, for example, the system 300 can be disposed on the first vehicle 102. For example, the instructions to produce the estimate of the available bandwidth for the transfer of the first file 134 can produce the estimate to be sixteen gigabits per second. For example, the instructions to determine the number of the connections needed to transfer the bulk data within the specific time duration can determine that the number of the connections needed to transfer the bulk data within the specific time duration is a quotient of thirty-two gigabits (four gigabytes multiplied by eight bits per byte) divided by sixteen gigabits per second, which is two connections. For example, the instructions to cause the transfer of the bulk data can: (1) divide the first file 134 into a first chunk 142 and a second chunk 144, (2) establish, for each of the connection 132-1 and the connection 132-2, a connection between the first vehicle 102 (i.e., the transmitting vehicle 138) and the second vehicle 104 (i.e., the receiving vehicle 140), and (3) cause: (a) for the connection 132-1, the transfer (A) of the first chunk 142 from the first vehicle 102 (i.e., the transmitting vehicle 138) to the second vehicle 104 (i.e., the receiving vehicle 140) and (b) for the connection 132-2, the transfer (B) of the second chunk 144 from the first vehicle 102 (i.e., the transmitting vehicle 138) to the second vehicle 104 (i.e., the receiving vehicle 140). For example, the transfer of the first chunk 142 can occur concurrently with the transfer of the second chunk 144.

For example, the wireless channel can be configured to operate in accordance with a Transmission Control Protocol (TCP), although the disclosed technologies are not limited to being used in a wireless channel configured to operate in accordance with TCP. Members of a micro cloud can be vehicles that include technologies for connected cars, which can include communications devices configured to exchange communications between the members in a packet-switched network. Packet-switched network technologies can group data of a file into packets for resilient conveyance through the packet-switched network. Such a manner of conveyance can give rise to a situation in which one or more packets are damaged or lost. TCP includes processes that can identify such damaged or lost packets and that can have such damaged or lost packets retransmitted. Such processes can have an unintended consequence of contributing to network congestion.

With reference to FIG. 2, for example, because each of the first micro cloud 270, the second micro cloud 272, the third micro cloud 274, and the fourth micro cloud 276 can overlap each other of the first micro cloud 270, the second micro cloud 272, the third micro cloud 274, and the fourth micro cloud 276, the first intersection 208 can be a location that can be susceptible to network congestion and a location in which the disclosed technologies can be effective for realizing a transfer of bulk data between vehicles of a specific micro cloud.

For example, the instructions to produce the estimate of the available bandwidth can include instructions to produce, in response to a determination of a pending commencement of the transfer of the bulk data, the estimate of the available bandwidth.

As an alternative, for example, the instructions to produce the estimate of the available bandwidth can include instructions to produce, at a periodic rate, the estimate of the available bandwidth. For example, the periodic rate can be between three seconds and five seconds.

As another alternative, for example, the instructions to produce the estimate of the available bandwidth can include instructions to produce, continuously, the estimate of the available bandwidth.

Returning to FIG. 3, in an implementation, for example, the available bandwidth estimation module 306 can further include instructions to cause the available bandwidth estimation model to be received from an available bandwidth estimation model production system.

With reference to FIGS. 1 and 3, for example, the system 300 can be disposed on the first vehicle 102. For example, the instructions to cause the available bandwidth estimation model to be received from an available bandwidth estimation model production system can cause the available bandwidth estimation model 124 to be received (C) from the available bandwidth estimation model production system 106.

Returning to FIG. 3, for example, the available bandwidth estimation model production system can be configured to use a machine learning technique to produce the available bandwidth estimation model.

With reference to FIGS. 1-3, for example, the system 300 can be disposed on the fourteenth vehicle 250. For example, the fourteenth vehicle 250 can be a transmitting vehicle (e.g., the transmitting vehicle 138) and the thirteenth vehicle 248 can be a receiving vehicle (e.g., the receiving vehicle 140). For example, the sensor 280 can detect an approach, in the lane 214, of the fifteenth vehicle 252 and the sixteenth vehicle 254. For example, the available bandwidth estimation model 124 can be configured to: (1) anticipate, in response to the approach of the fifteenth vehicle 252 and the sixteenth vehicle 254, an overlap between the fifth micro cloud 278 and another micro cloud (e.g., the sixth micro cloud 282) and (2) expect, in response to an anticipation of the overlap between the fifth micro cloud 278 and the other micro cloud (e.g., the sixth micro cloud 282), network congestion at a time at which the overlap between the fifth micro cloud 278 and the other micro cloud (e.g., the sixth micro cloud 282) occurs. For example, the instructions to cause the transfer of the bulk data can include instructions to cause, before the time at which the overlap between the fifth micro cloud 278 and the other micro cloud (e.g., the sixth micro cloud 282) occurs, the transfer (D) of the bulk data from the fourteenth vehicle 250 (e.g., the transmitting vehicle 138) to the thirteenth vehicle 248 (e.g., the receiving vehicle 140).

With reference to FIGS. 1-3, for example, the system 300 can be disposed on the eighteenth vehicle 258. For example, the eighteenth vehicle 258 can be a transmitting vehicle (e.g., the transmitting vehicle 138) and the seventeenth vehicle 256 can be a receiving vehicle (e.g., the receiving vehicle 140). For example, the precipitation 286 can cause a reduction in the current network metric. For example, the instructions to produce, using the available bandwidth estimation model, the current network metric, and the current vehicle trajectory information, the estimate of the available bandwidth can produce an estimate of the available bandwidth that is smaller than the estimate of the available bandwidth would be in an absence of the precipitation 286. For example, the instructions to cause the transfer of the bulk data can include instructions to cause, in a manner that accounts for a smaller estimate of the available bandwidth due to a presence of the precipitation 286, the transfer (E) of the bulk data from the eighteenth vehicle 258 (e.g., the transmitting vehicle 138) to the seventeenth vehicle 256 (e.g., the receiving vehicle 140).

Returning to FIG. 3, additionally or alternatively, for example, the memory 304 can further store a metrics collection module 310. For example, the metrics collection module 310 can include instructions that function to control the processor 302 to determine one or more of a network metric or vehicle trajectory information. For example: (1) a time of a determination of the network metric can be different from a time of a determination of the current network metric and (2) a time of a determination of the vehicle trajectory information can be different from a time of a determination of the current vehicle trajectory information. For example, the network metric can include one or more of a received signal strength, a signal-to-noise ratio, a measurement of available bandwidth, a measurement of network congestion, a measurement of packet loss and retransmission, a measurement of round-trip time, a measurement of throughput, or the like. For example, the vehicle trajectory information can include one or more of: (1) an intended path of travel of the transmitting vehicle, the receiving vehicle, another vehicle of the micro cloud, or any combination of these vehicles or (2) a speed of the transmitting vehicle, the receiving vehicle, the other vehicle, or any combination of these vehicles.

For example, the metrics collection module 310 can further include instructions to cause the network metric, the vehicle trajectory information, or both to be transmitted to the available bandwidth estimation model production system. For example, the network metric, the vehicle trajectory information, or both can be used by the available bandwidth estimation model production system to produce the available bandwidth estimation model.

With reference to FIGS. 1 and 3, for example, the system 300 can be disposed on the first vehicle 102. For example, the instructions to cause the network metric, the vehicle trajectory information, or both to be transmitted to the available bandwidth estimation model production system can cause the network metric, the vehicle trajectory information, or both to be transmitted (F) to the available bandwidth estimation model production system 106.

Returning to FIG. 3, in another implementation, for example, the memory 304 can further store the metrics collection module 310. For example, the metrics collection module 310 can include instructions that function to control the processor 302 to: (1) cause a chunk of data to be transmitted, as a probing transmission, from the transmitting vehicle to the receiving vehicle and (2) cause a result of the probing transmission to be received, from the receiving vehicle, by the transmitting vehicle. For example, the chunk of data can be a first portion of the bulk data. For example, the first portion can be between five percent of the bulk data and ten percent of the bulk data. For example: (1) remaining bulk data can be a second portion of the bulk data and (2) the second portion can include all of the bulk data except for the first portion. As an alternative, for example, the chunk of data can be different from the bulk data. For example, the result of the probing transmission can include one or more of a received signal strength, a signal-to-noise ratio, a measurement of throughput, a measurement of round-trip time, or the like.

For example, the instructions to produce the estimate of the available bandwidth can include instructions to produce, using the available bandwidth estimation model, the current network metric, the current vehicle trajectory information, and the result of the probing transmission, the estimate of the available bandwidth.

With reference to FIGS. 1 and 3, for example, the system 300 can be disposed on the first vehicle 102. For example, the instructions to cause the chunk of data to be transmitted can cause a chunk of data 146 to be transmitted, as the probing transmission, from the first vehicle 102 (i.e., the transmitting vehicle 138) to the second vehicle 104 (i.e., the receiving vehicle 140). For example, the chunk of data 146 can be a first portion 148 (G) of the second file 136. For example, the first portion 148 can be ten percent of the second file 136 (five hundred megabytes, which is ten percent of five gigabytes). For example, a remaining part 150 of the second file 136 can be a second portion 152 of the second file 136. That is, the second portion 152 can include all of the second file 136 except for the first portion 148. As an alternative, for example, the chunk of data 146 can be data 154 (H) different from the second file 136. For example, the instructions to cause the result of the probing transmission to be received can cause a result of the probing transmission to be received (I), from the second vehicle 104 (i.e., the receiving vehicle 140), by the first vehicle 102 (i.e., the transmitting vehicle 138).

For example, if the chunk of data 146 is the first portion 148 of the second file 136, then the instructions to produce the estimate of the available bandwidth for the transfer of the second file 136 can produce the estimate to be sixteen gigabits per second. For example, the instructions to determine the number of the connections needed to transfer the bulk data within the specific time duration can determine that the number of the connections needed to transfer the bulk data within the specific time duration is a quotient of thirty-six gigabits (four-and-a-half gigabytes (five hundred megabytes subtracted from five gigabytes) multiplied by eight bits per byte) divided by sixteen gigabits per second, which is two-and-a-quarter connections, which is rounded up to three connections. For example, the instructions to cause the transfer of the bulk data can: (1) divide the remaining part 150 of the second file 136 into a first chunk 158, a second chunk 160, and a third chunk 162, (2) establish, for each of the connection 132-1, the connection 132-2, and the connection 132-3, a connection between the first vehicle 102 (i.e., the transmitting vehicle 138) and the second vehicle 104 (i.e., the receiving vehicle 140), and (3) cause: (a) for the connection 132-1, the transfer (J) of the first chunk 158 from the first vehicle 102 (i.e., the transmitting vehicle 138) to the second vehicle 104 (i.e., the receiving vehicle 140), (b) for the connection 132-2, the transfer (K) of the second chunk 160 from the first vehicle 102 (i.e., the transmitting vehicle 138) to the second vehicle 104 (i.e., the receiving vehicle 140), and (c) for the connection 132-3, the transfer (L) of the third chunk 162 from the first vehicle 102 (i.e., the transmitting vehicle 138) to the second vehicle 104 (i.e., the receiving vehicle 140). For example, the transfer of the first chunk 158 can occur concurrently with the transfer of the second chunk 160, which can occur concurrently with the transfer of the third chunk 162.

Returning to FIG. 3, in a variation of this other implementation, for example, the available bandwidth estimation module 306 can further include instructions to determine a relationship between the result of the probing transmission and a threshold limit. For example, the instructions to produce the estimate of the available bandwidth can include instructions to produce, in response to a determination that the result of the probing transmission is outside of the threshold limit, the estimate of the available bandwidth. For example, the instructions to determine the number of the connections needed to transfer the bulk data within the specific time duration can include instructions to determine, in response to the determination that the result of the probing transmission is outside of the threshold limit, the number of the connections needed to transfer the bulk data within the specific time duration. For example, the instructions to cause the transfer of the bulk data can include instructions to cause, in response to the determination that the result of the probing transmission is outside of the threshold limit, the transfer of the bulk data. That is, in this variation of this other implementation, the transfer of the bulk data can be realized by a conventional process unless the result of the probing transmission is outside of the threshold limit.

In yet another implementation, for example, the instructions to determine the number of the connections needed to transfer the bulk data within the specific time duration can include instructions to divide the size of the bulk data (or a size of remaining bulk data (if a chunk of data transmitted, as a probing transmission, was a portion of the bulk data)) by the estimate of the available bandwidth. For example, the instructions to cause the transfer of the bulk data can include instructions to: (1) determine, in response to a determination that the number of the connections exceeds a number of available connections within the wireless channel, a time duration available for the transfer of the bulk data (or the remaining bulk data) and (2) cause, in response to a determination that the time duration available for the transfer of the bulk data (or the remaining bulk data) is greater than or equal to a time duration needed for the transfer of the bulk data (or the remaining bulk data), the transfer of the bulk data (or the remaining bulk data) from the transmitting vehicle to the receiving vehicle.

For example, the instructions to cause the transfer of the bulk data (or the remaining bulk data) can include instructions to cause, in a manner in which a single connection is on the wireless channel, the transfer of the bulk data (or the remaining bulk data).

As an alternative, for example, the instructions to cause the transfer of the bulk data (or the remaining bulk data) can include instructions to cause, in a manner in which a plurality of connections are on the wireless channel, the transfer of the bulk data (or the remaining bulk data).

For example, the instructions to cause the transfer of the bulk data (or the remaining bulk data) can further include instructions to schedule, in response to a determination that the time duration available for the transfer of the bulk data (or the remaining bulk data) is less than the time duration needed for the transfer of the bulk data (or the remaining bulk data), the transfer of the bulk data (or the remaining bulk data) to occur at a time later than a current time.

In still another implementation, for example, the system can be disposed on a vehicle of the micro cloud that is different from the transmitting vehicle. For example, the memory 304 can further store a communications module 312. For example, the communications module 312 can include instructions that function to control the processor 302 to cause: (1) a first signal to be received from the transmitting vehicle and (2) a second signal to be transmitted to the transmitting vehicle. For example, the first signal can include information about the size of the bulk data. For example, the second signal can include information about the number of the connections needed to transfer the bulk data within the specific time duration.

For example, the vehicle of the micro cloud that is different from the transmitting vehicle can be the receiving vehicle.

As an alternative, for example, the vehicle of the micro cloud that is different from the transmitting vehicle can be different from the receiving vehicle. For example, the vehicle of the micro cloud that is different from the transmitting vehicle and from the receiving vehicle can be a vehicle that is performing a function of a leader of the micro cloud.

With reference to FIGS. 1-3, for example, the system 300 can be disposed on the nineteenth vehicle 260. For example, the nineteenth vehicle 260 can be a receiving vehicle (e.g., the receiving vehicle 140) and the twentieth vehicle 262 can be a transmitting vehicle (e.g., the transmitting vehicle 138). For example, the current vehicle trajectory information can include information that the intended path of travel of: (1) the nineteenth vehicle 260 is east in the lane 222 and (2) the twentieth vehicle 262 is north in the lane 214. For example, the communications module 312 of the nineteenth vehicle 260 (e.g., the receiving vehicle 140) can cause: (1) the first signal (that includes the information about the size of the bulk data (or the size of the remaining bulk data (if a chunk of data transmitted, as a probing transmission, was a portion of the bulk data))) to be received (M) from the twentieth vehicle 262 (e.g., the transmitting vehicle 138) and (2) the second signal (that includes the information about the number of the connections needed to transfer the bulk data within the specific time duration) to be transmitted (N) to the twentieth vehicle 262 (e.g., the transmitting vehicle 138). For example, the instructions to produce, using the available bandwidth estimation model, the current network metric, and the current vehicle trajectory information, the estimate of the available bandwidth can produce, in response to an expectation of an increase in a distance between the nineteenth vehicle 260 and the twentieth vehicle 262, an estimate of the available bandwidth that is smaller than the estimate of the available bandwidth would be in an absence of the expectation of the increase in the distance between the nineteenth vehicle 260 and the twentieth vehicle 262. For example, the instructions to determine the number of the connections needed to transfer the bulk data within the specific time duration can include instructions to divide the size of the bulk data (or the size of the remaining bulk data) by this smaller estimate of the available bandwidth. For example, the instructions to cause the transfer of the bulk data (or the remaining bulk data) can include instructions to: (1) determine, in response to a determination that the number of the connections exceeds a number of available connections within the wireless channel, a time duration available for the transfer of the bulk data (or the remaining bulk data) and (2) schedule, in response to a determination that the time duration available for the transfer of the bulk data (or the remaining bulk data) is less than the time duration needed for the transfer of the bulk data (or the remaining bulk data), the transfer of the bulk data (or the remaining bulk data) to occur at a time later than a current time. That is, in this example of this still other implementation, the system 300 can prevent the transfer of the bulk data at the current time.

With reference to FIGS. 1-3, for example, the system 300 can be disposed on the twenty-second vehicle 266. For example, the twenty-third vehicle 268 can be a transmitting vehicle (e.g., the transmitting vehicle 138) and the twenty-first vehicle 264 can be a receiving vehicle (e.g., the receiving vehicle 140). For example, the current vehicle trajectory information can include information that the speed of the twenty-third vehicle 268 is greater than the speed of the twenty-first vehicle 264. For example, the communications module 312 of the twenty-second vehicle 266 can cause: (1) the first signal (that includes the information about the size of the bulk data (or the size of the remaining bulk data (if a chunk of data transmitted, as a probing transmission, was a portion of the bulk data))) to be received (O) from the twenty-third vehicle 268 (e.g., the transmitting vehicle 138) and (2) the second signal (that includes the information about the number of the connections needed to transfer the bulk data within the specific time duration) to be transmitted (P) to the twenty-third vehicle 268 (e.g., the transmitting vehicle 138). For example, the instructions to produce, using the available bandwidth estimation model, the current network metric, and the current vehicle trajectory information, the estimate of the available bandwidth can produce, in response to an expectation of an increase in a distance between the twenty-first vehicle 264 and the twenty-third vehicle 268, an estimate of the available bandwidth that is smaller than the estimate of the available bandwidth would be in an absence of the expectation of the increase in the distance between the twenty-first vehicle 264 and the twenty-third vehicle 268. For example, the instructions to determine the number of the connections needed to transfer the bulk data within the specific time duration can include instructions to divide the size of the bulk data (or the size of the remaining bulk data) by this smaller estimate of the available bandwidth. For example, the instructions to cause the transfer of the bulk data (or the remaining bulk data) can include instructions to: (1) determine, in response to a determination that the number of the connections exceeds a number of available connections within the wireless channel, a time duration available for the transfer of the bulk data (or the remaining bulk data) and (2) cause, in response to a determination that the time duration available for the transfer of the bulk data (or the remaining bulk data) is greater than or equal to a time duration needed for the transfer of the bulk data (or the remaining bulk data), the transfer (Q) of the bulk data (or the remaining bulk data) from the twenty-third vehicle 268 (e.g., the transmitting vehicle 138) to the twenty-first vehicle 264 (e.g., the receiving vehicle 140). For example, the instructions to cause the transfer of the bulk data (or the remaining bulk data) can include instructions to cause, in a manner in which a single connection is on the wireless channel, the transfer of the bulk data (or the remaining bulk data). As an alternative, for example, the instructions to cause the transfer of the bulk data (or the remaining bulk data) can include instructions to cause, in a manner in which a plurality of connections are on the wireless channel, the transfer of the bulk data (or the remaining bulk data).

Figure 4A:
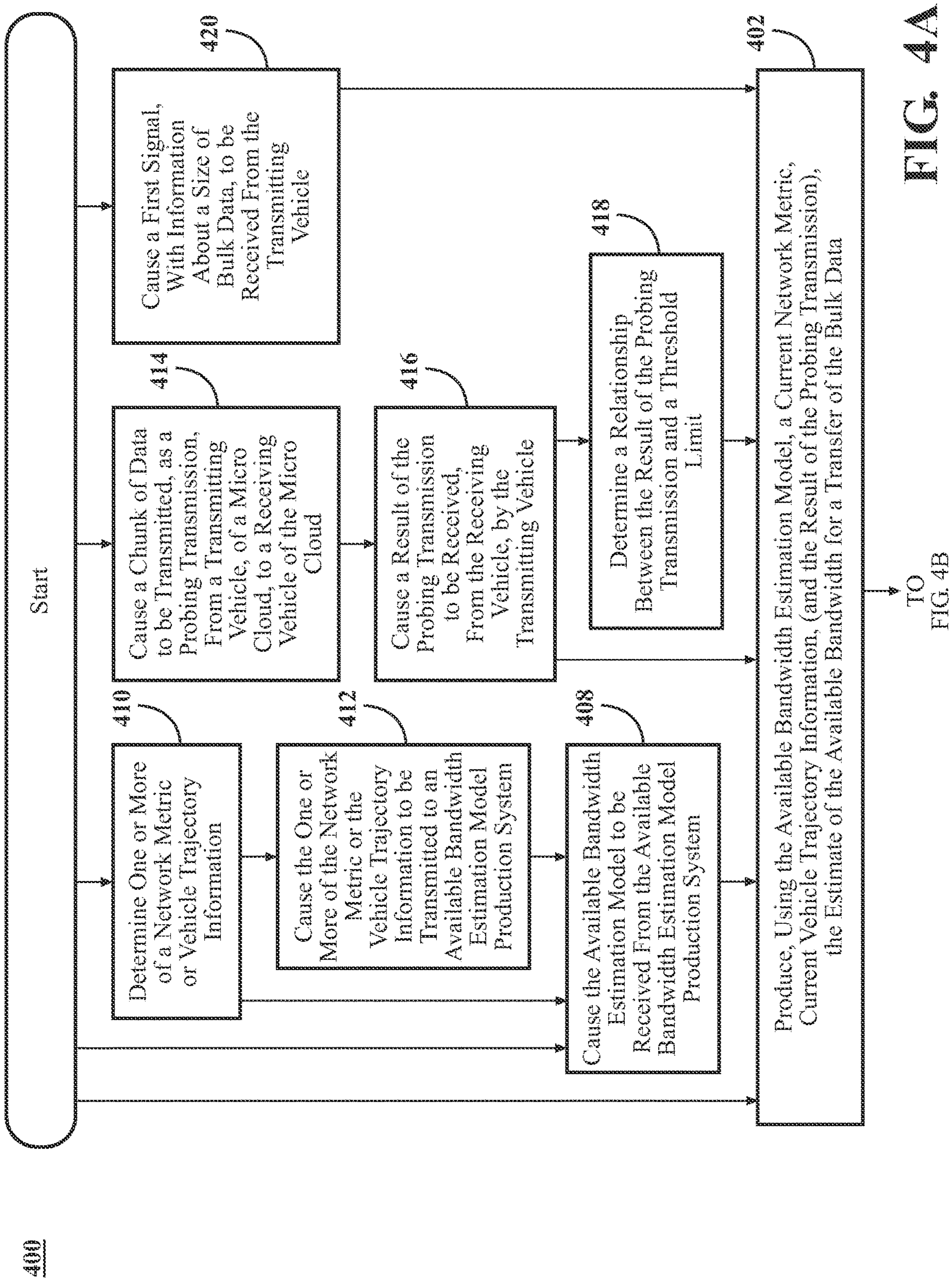
FIGS. 4A and 4B include a flow diagram that illustrates an example of a method that is associated with transferring bulk data between vehicles of a micro cloud, according to the disclosed technologies.
Figure 4B:
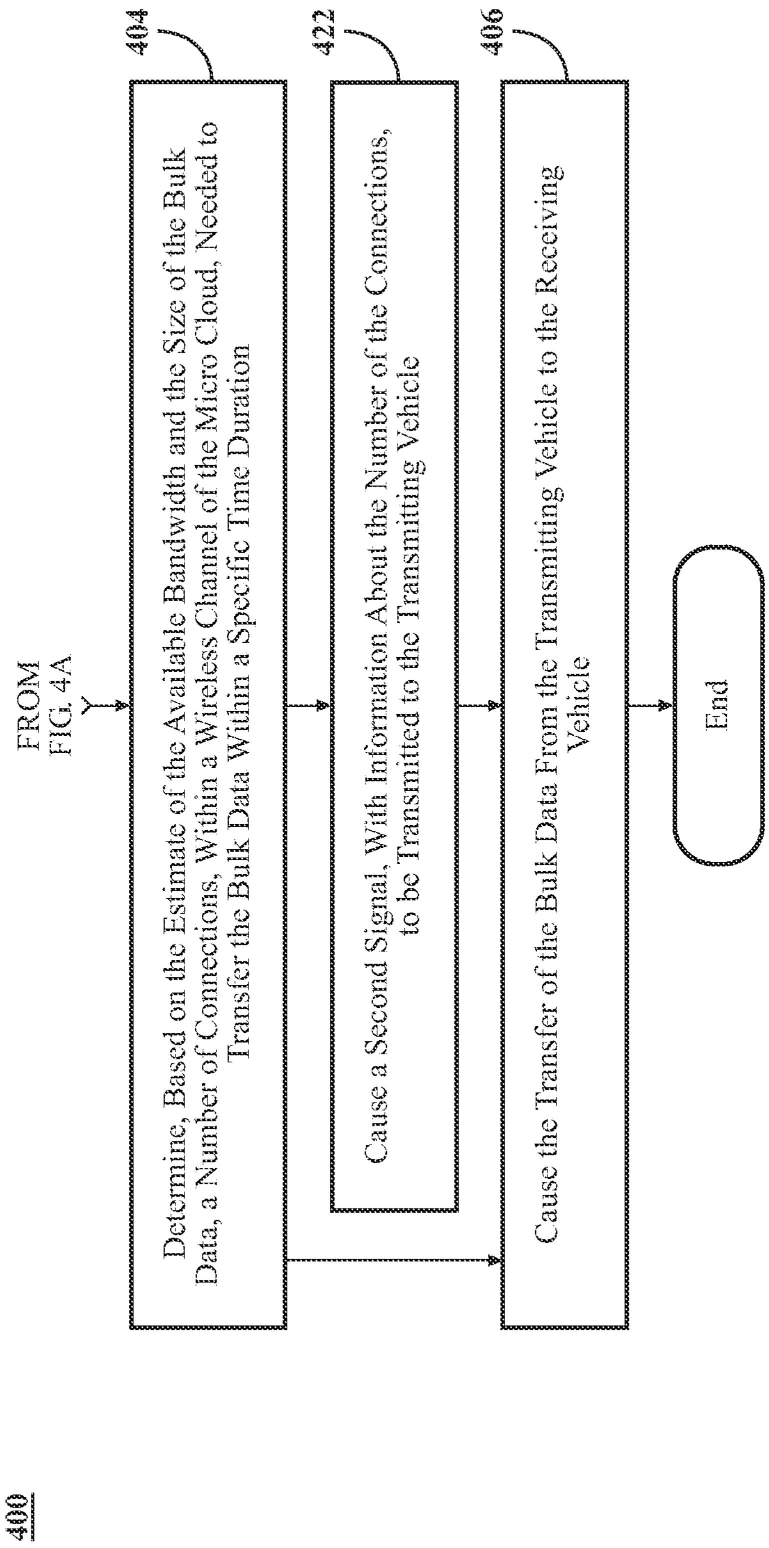

FIGS. 4A and 4B include a flow diagram that illustrates an example of a method 400 that is associated with transferring bulk data between vehicles of a micro cloud, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel.

In FIG. 4A, in the method 400, at an operation 402, for example, the available bandwidth estimation module 306 can produce, using an available bandwidth estimation model, a current network metric, and current vehicle trajectory information, an estimate of an available bandwidth for a transfer of the bulk data. For example, the current network metric can include one or more of a received signal strength, a signal-to-noise ratio, a measurement of available bandwidth, a measurement of network congestion, a measurement of packet loss and retransmission, a measurement of round-trip time, a measurement of throughput, or the like. For example, the current vehicle trajectory information can include one or more of: (1) an intended path of travel of the transmitting vehicle, the receiving vehicle, another vehicle of the micro cloud, or any combination of these vehicles or (2) a speed of the transmitting vehicle, the receiving vehicle, the other vehicle, or any combination of these vehicles.

In FIG. 4B, in the method 400, at an operation 404, for example, the bulk data transfer module 308 can determine, based on the estimate of the available bandwidth and a size of the bulk data, a number of connections, within a wireless channel of a micro cloud, needed to transfer the bulk data within a specific time duration. For example, the bulk data transfer module 308 can divide the size of the bulk data by the estimate of the available bandwidth.

For example, at an operation 406, the bulk data transfer module 308 can cause the transfer of the bulk data from a transmitting vehicle, of the micro cloud, to a receiving vehicle of the micro cloud. For example, the bulk data transfer module 308 can: (1) divide the bulk data into one or more chunks, (2) establish, for each of the connections needed to transfer the bulk data within the specific time duration, a connection between the transmitting vehicle and the receiving vehicle, and (3) cause, for the each of the connections needed to transfer the bulk data within the specific time duration, a transfer of a corresponding chunk, of the chunks, from the transmitting vehicle to the receiving vehicle. For example, a number of the one or more chunks can be equal to the number of the connections needed to transfer the bulk data within the specific time duration.

For example, the wireless channel can be configured to operate in accordance with a Transmission Control Protocol (TCP), although the disclosed technologies are not limited to being used in a wireless channel configured to operate in accordance with TCP. Members of a micro cloud can be vehicles that include technologies for connected cars, which can include communications devices configured to exchange communications between the members in a packet-switched network. Packet-switched network technologies can group data of a file into packets for resilient conveyance through the packet-switched network. Such a manner of conveyance can give rise to a situation in which one or more packets are damaged or lost. TCP includes processes that can identify such damaged or lost packets and that can have such damaged or lost packets retransmitted. Such processes can have an unintended consequence of contributing to network congestion.

For example, at the operation 402, the available bandwidth estimation module 306 can produce, in response to a determination of a pending commencement of the transfer of the bulk data, the estimate of the available bandwidth.

As an alternative, for example, at the operation 402, the available bandwidth estimation module 306 can produce, at a periodic rate, the estimate of the available bandwidth. For example, the periodic rate can be between three seconds and five seconds.

As another alternative, for example, at the operation 402, the available bandwidth estimation module 306 can produce, continuously, the estimate of the available bandwidth.

In FIG. 4A, additionally, in an implementation of the method 400, at an operation 408, for example, the available bandwidth estimation module 306 can cause the available bandwidth estimation model to be received from an available bandwidth estimation model production system.

For example, the available bandwidth estimation model production system can be configured to use a machine learning technique to produce the available bandwidth estimation model.

Additionally or alternatively, for example, at an operation 410, the metrics collection module 310 can determine one or more of a network metric or vehicle trajectory information. For example: (1) a time of a determination of the network metric can be different from a time of a determination of the current network metric and (2) a time of a determination of the vehicle trajectory information can be different from a time of a determination of the current vehicle trajectory information. For example, the network metric can include one or more of a received signal strength, a signal-to-noise ratio, a measurement of available bandwidth, a measurement of network congestion, a measurement of packet loss and retransmission, a measurement of round-trip time, a measurement of throughput, or the like. For example, the vehicle trajectory information can include one or more of: (1) an intended path of travel of the transmitting vehicle, the receiving vehicle, another vehicle of the micro cloud, or any combination of these vehicles or (2) a speed of the transmitting vehicle, the receiving vehicle, the other vehicle, or any combination of these vehicles.

Additionally, for example, at an operation 412, the metrics collection module 310 can cause the network metric, the vehicle trajectory information, or both to be transmitted to the available bandwidth estimation model production system. For example, the network metric, the vehicle trajectory information, or both can be used by the available bandwidth estimation model production system to produce the available bandwidth estimation model.

Additionally, in another implementation, at an operation 414, for example, the metrics collection module 310 can cause a chunk of data to be transmitted, as a probing transmission, from the transmitting vehicle to the receiving vehicle. For example, the chunk of data can be a first portion of the bulk data. For example, the first portion can be between five percent of the bulk data and ten percent of the bulk data. For example, at an operation 416, the metrics collection module 310 can cause a result of the probing transmission to be received, from the receiving vehicle, by the transmitting vehicle. For example: (1) remaining bulk data can be a second portion of the bulk data and (2) the second portion can include all of the bulk data except for the first portion. As an alternative, for example, the chunk of data can be different from the bulk data. For example, the result of the probing transmission can include one or more of a received signal strength, a signal-to-noise ratio, a measurement of throughput, a measurement of round-trip time, or the like.

For example, at the operation 402, the available bandwidth estimation module 306 can produce, using the available bandwidth estimation model, the current network metric, the current vehicle trajectory information, and the result of the probing transmission, the estimate of the available bandwidth.

Additionally, in a variation of this other implementation, at an operation 418, for example, the available bandwidth estimation module 306 can determine a relationship between the result of the probing transmission and a threshold limit. For example, at the operation 402, the available bandwidth estimation module 306 can produce, in response to a determination that the result of the probing transmission is outside of the threshold limit, the estimate of the available bandwidth. In FIG. 4B, in this variation of this other implementation of the method 400, at the operation 404, for example, the bulk data transfer module 308 can determine, in response to the determination that the result of the probing transmission is outside of the threshold limit, the number of the connections needed to transfer the bulk data within the specific time duration. For example, at the operation 406, the bulk data transfer module 308 can cause, in response to the determination that the result of the probing transmission is outside of the threshold limit, the transfer of the bulk data. That is, in this variation of this other implementation, the transfer of the bulk data can be realized by a conventional process unless the result of the probing transmission is outside of the threshold limit.

Additionally, in yet another implementation, at the operation 404, for example, the bulk data transfer module 308 can divide the size of the bulk data (or a size of remaining bulk data (if a chunk of data transmitted, as a probing transmission, was a portion of the bulk data)) by the estimate of the available bandwidth. For example, at the operation 406, the bulk data transfer module 308 can: (1) determine, in response to a determination that the number of the connections exceeds a number of available connections within the wireless network, a time duration available for the transfer of the bulk data (or the remaining bulk data) and (2) cause, in response to a determination that the time duration available for the transfer of the bulk data (or the remaining bulk data) is greater than or equal to a time duration needed for the transfer of the bulk data (or the remaining bulk data), the transfer of the bulk data (or the remaining bulk data) from the transmitting vehicle to the receiving vehicle.

For example, at the operation 406, the bulk data transfer module 308 can cause, in a manner in which a single connection is on the wireless channel, the transfer of the bulk data (or the remaining bulk data).

As an alternative, for example, at the operation 406, the bulk data transfer module 308 can cause, in a manner in which a plurality of connections are on the wireless channel, the transfer of the bulk data (or the remaining bulk data).

For example, at the operation 406, the bulk data transfer module 308 can schedule, in response to a determination that the time duration available for the transfer of the bulk data (or the remaining bulk data) is less than the time duration needed for the transfer of the bulk data (or the remaining bulk data), the transfer of the bulk data (or the remaining bulk data) to occur at a time later than a current time.

For example, the method 400 can be performed by a processor disposed on the transmitting vehicle.

Additionally, in still another implementation, the method 400 can be performed, for example, by a processor disposed on a vehicle of the micro cloud that is different from the transmitting vehicle. In FIG. 4A, in this still other implementation of the method 400, at an operation 420, for example, the communications module 312 can cause a first signal to be received from the transmitting vehicle. For example, the first signal can include information about the size of the bulk data.

In FIG. 4B, in this still other implementation of the method 400, at an operation 422, for example, the communications module 312 can cause a second signal to be transmitted to the transmitting vehicle. For example, the second signal can include information about the number of the connections needed to transfer the bulk data within the specific time duration.

For example, the vehicle of the micro cloud that is different from the transmitting vehicle can be the receiving vehicle.

As an alternative, for example, the vehicle of the micro cloud that is different from the transmitting vehicle can be different from the receiving vehicle. For example, the vehicle of the micro cloud that is different from the transmitting vehicle and from the receiving vehicle can be a vehicle that is performing a function of a leader of the micro cloud.

Figure 5:
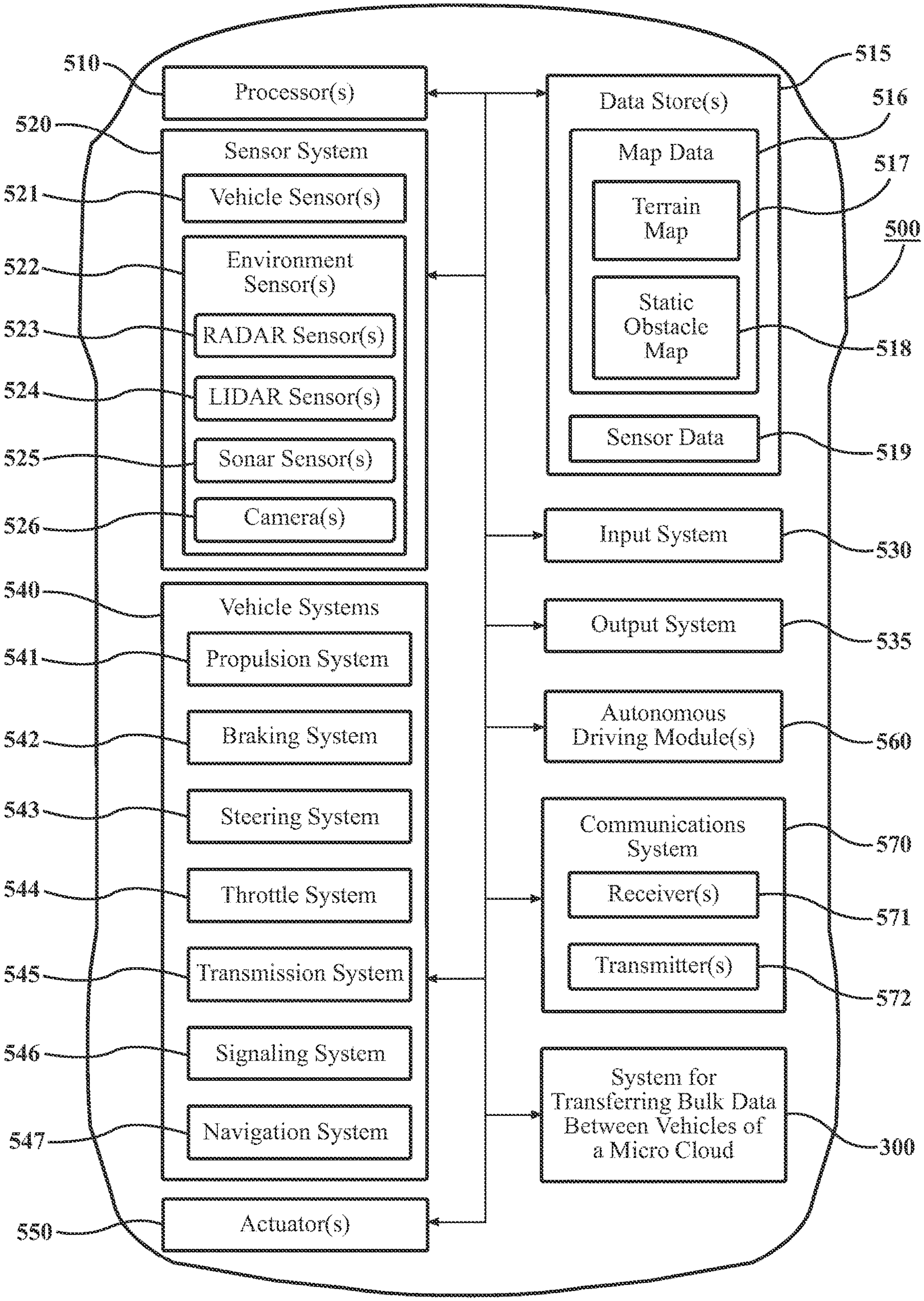
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 102 (illustrated in FIG. 1), the second vehicle 104 (illustrated in FIG. 1), the first vehicle 224 (illustrated in FIG. 2), the second vehicle 226 (illustrated in FIG. 2), the third vehicle 228 (illustrated in FIG. 2), the fourth vehicle 230 (illustrated in FIG. 2), the fifth vehicle 232 (illustrated in FIG. 2), the sixth vehicle 234 (illustrated in FIG. 2), the seventh vehicle 236 (illustrated in FIG. 2), the eighth vehicle 238 (illustrated in FIG. 2), the ninth vehicle 240 (illustrated in FIG. 2), the tenth vehicle 242 (illustrated in FIG. 2), the eleventh vehicle 244 (illustrated in FIG. 2), the twelfth vehicle 246 (illustrated in FIG. 2), the thirteenth vehicle 248 (illustrated in FIG. 2), the fourteenth vehicle 250 (illustrated in FIG. 2), the fifteenth vehicle 252 (illustrated in FIG. 2), the sixteenth vehicle 254 (illustrated in FIG. 2), the seventeenth vehicle 256 (illustrated in FIG. 2), the eighteenth vehicle 258 (illustrated in FIG. 2), the nineteenth vehicle 260 (illustrated in FIG. 2), the twentieth vehicle 262 (illustrated in FIG. 2), the twenty-first vehicle 264 (illustrated in FIG. 2), the twenty-second vehicle 266 (illustrated in FIG. 2), or the twenty-third vehicle 268 (illustrated in FIG. 2) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and a system 300 for transferring bulk data between vehicles of a micro cloud.

In one or more arrangements, the one or more processors 510 can be a main processor of the vehicle 500. For example, the one or more processors 510 can be an electronic control unit (ECU). For example, functions and/or operations of the processor 108 (illustrated in FIG. 1), the processor 116 (illustrated in FIG. 1), or the processor 302 (illustrated in FIG. 3) can be realized by the one or more processors 510.

The one or more data stores 515 can store, for example, one or more types of data. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation. For example, functions and/or operations of the memory 110 (illustrated in FIG. 1), the memory 118 (illustrated in FIG. 1), or the memory 304 (illustrated in FIG. 3) can be realized by the one or more data stores 515.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the sensor 280 (illustrated in FIG. 2) can be realized by the one or more environment sensors 522.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 112 (illustrated in FIG. 1) or the communications device 120 (illustrated in FIG. 1) can be realized by the communications system 570.

Moreover, the one or more processors 510, the one or more data stores 515, and the communications system 570 can be configured to one or more of form a micro cloud, participate as a member of a micro cloud, or perform a function of a leader of a micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A, 4B, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing:

an available bandwidth estimation module including instructions that, when executed by the processor, cause the processor to produce, using an available bandwidth estimation model, a current network metric, and current vehicle trajectory information, an estimate of an available bandwidth for a transfer of bulk data; and a bulk data transfer module including instructions that, when executed by the processor, cause the processor to:

determine, based on the estimate and a size of the bulk data, a number of connections, within a wireless channel of a micro cloud, needed to transfer the bulk data within a specific time duration; and cause the transfer of the bulk data from a transmitting vehicle, of the micro cloud, to a receiving vehicle of the micro cloud.

2. The system of claim 1, wherein the available bandwidth estimation module further includes instructions to cause the available bandwidth estimation model to be received from an available bandwidth estimation model production system.

3. The system of claim 2, wherein:

the memory further stores a metrics collection module including instructions that, when executed by the processor, cause the processor to determine at least one of a network metric or vehicle trajectory information, a time of a determination of the network metric is different from a time of a determination of the current network metric, and a time of a determination of the vehicle trajectory information is different from a time of a determination of the current vehicle trajectory information.

4. The system of claim 3, wherein:

the metrics collection module further includes instructions to cause the at least one of the network metric or the vehicle trajectory information to be transmitted to the available bandwidth estimation model production system, and the at least one of the network metric or the vehicle trajectory information is used by the available bandwidth estimation model production system to produce the available bandwidth estimation model.

5. The system of claim 3, wherein at least one of the current network metric or the network metric comprises at least one of a received signal strength, a signal-to-noise ratio, a measurement of available bandwidth, a measurement of network congestion, a measurement of packet loss and retransmission, a measurement of round-trip time, or a measurement of throughput.

6. The system of claim 3, wherein at least one of the current vehicle trajectory information or the vehicle trajectory information comprises at least one of:

an intended path of travel of at least one of the transmitting vehicle, the receiving vehicle, or another vehicle of the micro cloud, or a speed of the at least one of the transmitting vehicle, the receiving vehicle, or the other vehicle.

7. The system of claim 1, the memory further stores a metrics collection module including instructions that, when executed by the processor, cause the processor to:

cause a chunk of data to be transmitted, as a probing transmission, from the transmitting vehicle to the receiving vehicle; and cause a result of the probing transmission to be received, from the receiving vehicle, by the transmitting vehicle.

8. The system of claim 7, wherein the chunk of data is a portion of the bulk data.

9. The system of claim 7, wherein the result of the probing transmission includes at least one of a received signal strength, a signal-to-noise ratio, a measurement of throughput, or a measurement of round-trip time.

10. The system of claim 7, wherein:

the available bandwidth estimation module further includes instructions to determine a relationship between the result of the probing transmission and a threshold limit, the instructions to produce the estimate of the available bandwidth include instructions to produce, in response to a determination that the result of the probing transmission is outside of the threshold limit, the estimate of the available bandwidth, the instructions to determine the number of the connections needed to transfer the bulk data within the specific time duration include instructions to determine, in response to the determination that the result of the probing transmission is outside of the threshold limit, the number of the connections needed to transfer the bulk data within the specific time duration, and the instructions to cause the transfer of the bulk data include instructions to cause, in response to the determination that the result of the probing transmission is outside of the threshold limit, the transfer of the bulk data.

11. The system of claim 7, wherein the instructions to produce the estimate of the available bandwidth include instructions to produce, using the available bandwidth estimation model, the current network metric, the current vehicle trajectory information, and the result of the probing transmission, the estimate of the available bandwidth.

12. The system of claim 1, wherein:

the instructions to determine the number of the connections needed to transfer the bulk data within the specific time duration include instructions to divide one of the size of the bulk data or a size of remaining bulk data by the estimate of the available bandwidth, and the instructions to cause the transfer of the bulk data include instructions to:

divide one of the bulk data or the remaining bulk data into at least one chunk, wherein a number of the at least one chunk is equal to the number of the connections needed to transfer the bulk data within the specific time duration, establish, for each of the connections needed to transfer the bulk data within the specific time duration, a connection between the transmitting vehicle and the receiving vehicle, and cause, for the each of the connections needed to transfer the bulk data within the specific time duration, a transfer of a corresponding chunk, of the chunks, from the transmitting vehicle to the receiving vehicle.

13. The system of claim 12, wherein:

in response to the number of the connections needed to transfer the bulk data within the specific time duration being greater than one, the wireless channel is a bonded channel and the connections needed to transfer the bulk data within the specific time duration include a first connection on the bonded channel and a second connection on the bonded channel, the chunks include a first chunk and a second chunk, and the instructions to cause, for the each of the connections needed to transfer the bulk data within the specific time duration, the transfer of the corresponding chunk, of the chunks, include instructions to:

cause, for the first connection on the bonded channel, the transfer of the first chunk, and cause, for the second connection on the bonded channel, the transfer of the second chunk, and the transfer of the first chunk occurs concurrently with the transfer of the second chunk.

14. The system of claim 1, wherein:

the instructions to determine the number of the connections needed to transfer the bulk data within the specific time duration include instructions to divide one of the size of the bulk data or a size of remaining bulk data by the estimate of the available bandwidth, and the instructions to cause the transfer of the bulk data include instructions to:

determine, in response to a determination that the number of the connections exceeds a number of available connections within the wireless channel, a time duration available for the transfer of one of the bulk data or the remaining bulk data;

cause, in response to a determination that the time duration available for the transfer of the one of the bulk data or the remaining bulk data is greater than or equal to a time duration needed for the transfer of the one of the bulk data or the remaining bulk data, the transfer of the one of the bulk data or the remaining bulk data from the transmitting vehicle to the receiving vehicle.

15. The system of claim 14, wherein the instructions to cause the transfer of the one of the bulk data or the remaining bulk data include instructions to cause, in a manner in which a single connection is on the wireless channel, the transfer of the one of the bulk data or the remaining bulk data.

16. The system of claim 1, wherein the system is disposed on the transmitting vehicle.

17. The system of claim 1, wherein:

the system is disposed on a vehicle of the micro cloud that is different from the transmitting vehicle, the memory further stores a communications module including instructions that, when executed by the processor, cause the processor to:

cause a first signal to be received from the transmitting vehicle, wherein the first signal includes information about the size of the bulk data; and cause a second signal to be transmitted to the transmitting vehicle, wherein the second signal includes information about the number of the connections needed to transfer the bulk data within the specific time duration.

18. A method, comprising:

producing, by a processor using an available bandwidth estimation model, a current network metric, and current vehicle trajectory information, an estimate of an available bandwidth for a transfer of bulk data;

determining, by the processor and based on the estimate and a size of the bulk data, a number of connections, within a wireless channel of a micro cloud, needed to transfer the bulk data within a specific time duration; and causing, by the processor, the transfer of the bulk data from a transmitting vehicle, of the micro cloud, to a receiving vehicle of the micro cloud.

19. The method of claim 18:

further comprising causing, by the processor, the available bandwidth estimation model to be received from an available bandwidth estimation model production system, wherein the available bandwidth estimation model production system is configured to use a machine learning technique to produce the available bandwidth estimation model.

20. A non-transitory computer-readable medium for transferring bulk data between vehicles of a micro cloud, the non-transitory computer-readable medium including instructions that, when executed by one or more processors, cause the one or more processors to:

produce, using an available bandwidth estimation model, a current network metric, and current vehicle trajectory information, an estimate of an available bandwidth for a transfer of bulk data;

determine, based on the estimate and a size of the bulk data, a number of connections, within a wireless channel of a micro cloud, needed to transfer the bulk data within a specific time duration; and cause the transfer of the bulk data from a transmitting vehicle, of the micro cloud, to a receiving vehicle of the micro cloud.

* * * * *